United States Patent [19]

Courtis et al.

[11] 3,994,513

[45] Nov. 30, 1976

[54] ATTACHMENT ASSEMBLY FOR MOTOR VEHICLES

[75] Inventors: Norman Robert Courtis, Birmingham; Richard Henry Clarkson, Dorridge, both of England

[73] Assignee: Norman Robert Courtis, Birmingham, England

[22] Filed: Aug. 20, 1975

[21] Appl. No.: 606,010

[30] Foreign Application Priority Data
Aug. 24, 1974 United Kingdom............... 37374/74

[52] U.S. Cl................................. 280/747; 297/389
[51] Int. Cl.²........................................ B60R 21/10
[58] Field of Search ......... 280/150 SB, 179 R, 744, 280/747; 297/385, 389, 390; 248/251; 403/189; 224/42.45 B, 42.45 A, 42.46 A, 42.46 B, 29 D

[56] References Cited
UNITED STATES PATENTS

| | | | |
|---|---|---|---|
| 1,898,090 | 2/1933 | Lethern.................... | 280/150 SB X |
| 2,886,259 | 5/1959 | Barecki.................... | 280/150 SB X |
| 2,988,135 | 6/1961 | Caminiti.................. | 297/390 X |
| 2,993,708 | 7/1961 | Holman, Jr.............. | 280/179 B |
| 3,909,041 | 9/1975 | Murakami et al......... | 280/150 SB |

FOREIGN PATENTS OR APPLICATIONS 1,318,721   1/1963   France............................... 297/390

*Primary Examiner*—M. H. Wood, Jr.
*Assistant Examiner*—Michael J. Forman
*Attorney, Agent, or Firm*—Marshall & Yeasting

[57] ABSTRACT

An attachment assembly is disclosed for providing anchorage points in a motor vehicle for attachment of passenger safety restraints such as children seating units and safety harnesses, headrests and such like. The assembly includes a beam and a pair of mountings adapted to co-operate with respective ends of the beam and arranged, in use, to support the beam in a position adjacent the top of a vehicle seat or seats. Each mounting includes an attachment plate to be secured to the vehicle and having flanges forming a mouth for lateral reception of the respective beam end and an apertured box-shaped casing provided on the respective beam end and interfittable with the flanges so as to close the mouth and constrain the beam from movement laterally and lengthwise of the mountings.

9 Claims, 3 Drawing Figures

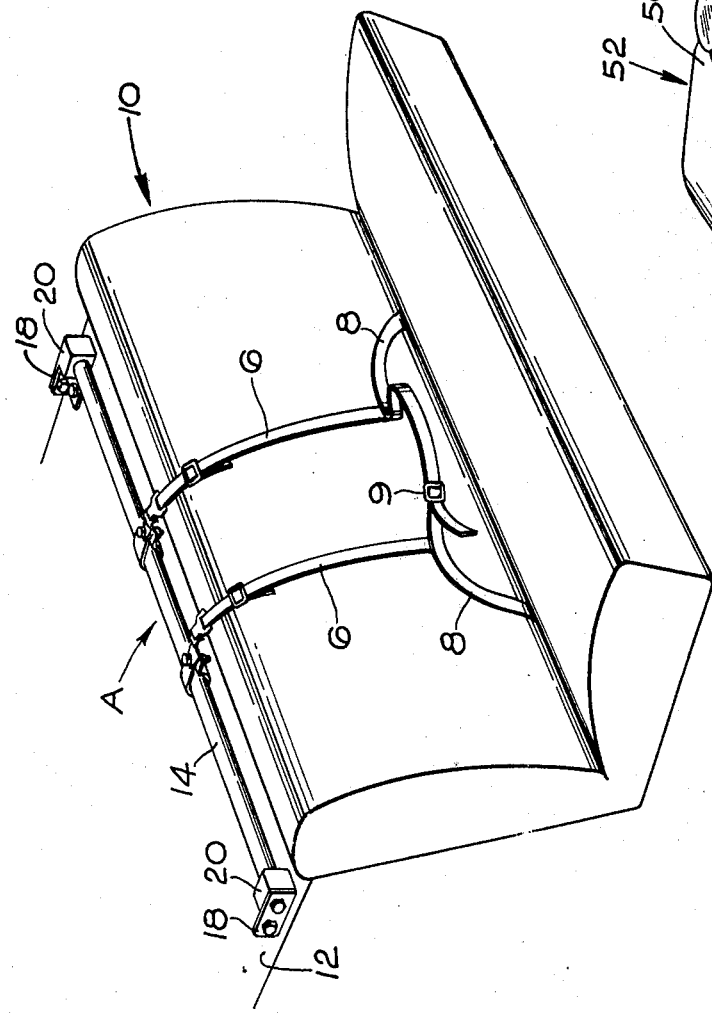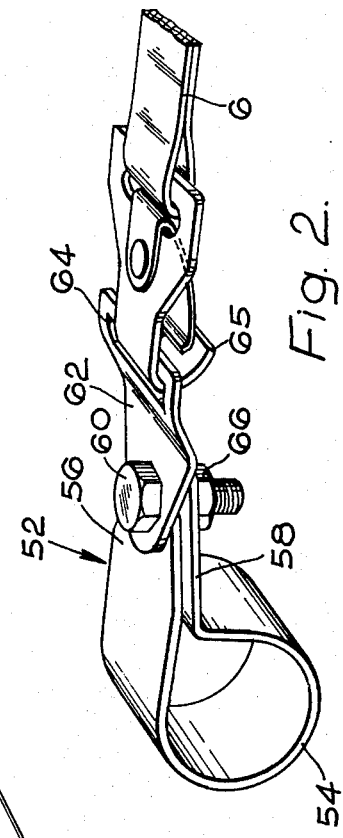

ATTACHMENT ASSEMBLY FOR MOTOR VEHICLES

This invention relates to an assembly for providing anchorage points in a motor vehicle for attachment of passenger restraints such as a child's safety harness, a carry-cot restraint, a head or neck restraints or child's seating unit.

According to one aspect of the present invention we provide, in or for a motor vehicle, an assembly for providing anchorage points within the motor vehicle for attachment of a passenger restraint, characterised in that said assembly comprises an elongate beam and mounting structures co-operable with respective portions of the beam and adapted to be secured within the motor vehicle such that the beam extends transversely of the fore-and-aft axis of the vehicle adjacent the top of the backrest(s) of one or more seats within the vehicle.

Preferably each mounting structure comprises a first part adapted to be secured to a fixed part of the vehicle, said first part being formed with a mouth for reception of a respective end portion of the beam, the mouth opening laterally with respect to the beam, and a second part which is mounted on the beam for movement axially thereof, said first and second parts being interfittable in such a way that the second part is constrained laterally by the first part and the beam is constrained laterally by the second part.

Conveniently the beam and the first part of each mounting structure have inter-engageable spigot and socket formations which, when interengaged, hold the beam axially captive with respect to each first part and detent means may be provided for releasably retaining said first and second parts in interfitting relation.

In a preferred embodiment the mouth of said first part is defined by one or more flanges which extend around part of the periphery of the beam so as to allow the beam to be introduced laterally into the confines of said flange or flanges, and wherein the second part includes one or more flanges which, when the parts are interfitted with the beam received within said mouth, extend around a remaining part of the periphery of the beam so as to prevent lateral withdrawal of the beam from said mouth.

BRIEF DESCRIPTION OF THE DRAWINGS

FIG. 1 is a diagrammatic view of the rear seat of a motor vehicle showing the use of the assembly of providing anchorage points for a child's safety harness;

FIG. 2 is an enlarged view showing a clamping member forming part of the assembly shown in FIG. 1.

DESCRIPTION OF THE PREFERRED EMBODIMENT

Figure 3:
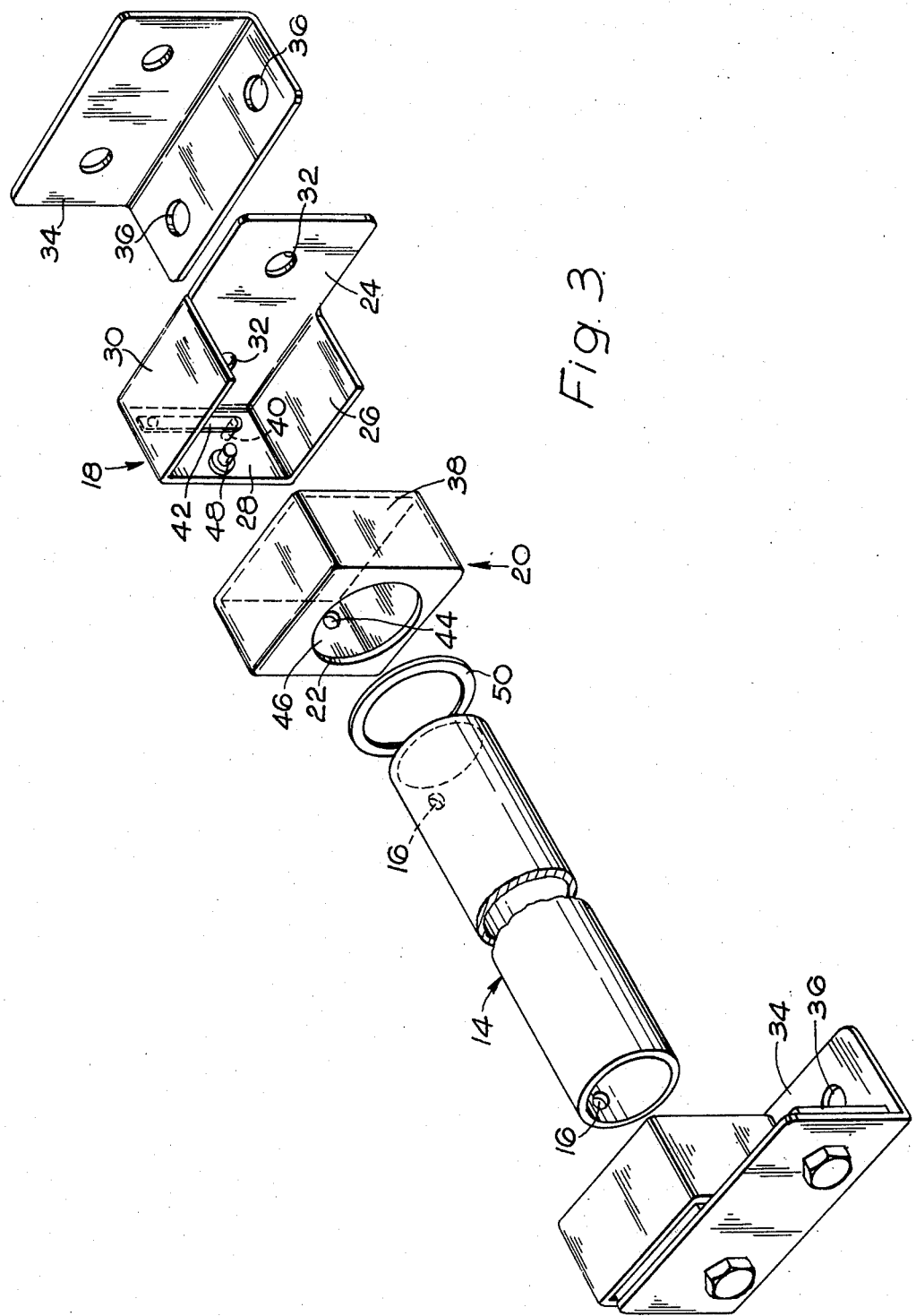
FIG. 3 is an exploded view of the beam and mounting structures of the assembly of FIG. 1, as seen in the direction A.

Referring firstly to FIGS. 1 and 2, numeral 10 designates the rear seat of a motor vehicle which may be of the saloon type having a parcel shelf 12 immediately to the rear of the rear seat. To provide anchorage points within the vehicle for attachment to a child's safety harness, a headrest (not shown), or a child's seating unit, a tubular beam 14 is mounted rearwardly of, and adjacent the top of, the backrest of the seat 10. As shown in FIG. 3, the beam 14 is of round-section and may be of mild steel, the beam being dimensioned so as to extend across at least the major part of the width of the vehicle and across the entire width when used in estate cars.

The beam 14 may be used to provide attachment points for various forms of passenger restraints, and its use with a safety harness is shown in FIG. 1. The harness may comprise a first pair of flexible straps 6 which are adjustable in length and extend parallel to one another lengthwise of the child—s trunk and over the shoulders, the upper ends of said straps terminating in hood-shaped metal attachment plates, and a further pair of transverse straps 8 united to the lower ends of the first pair of straps and forming lap straps, the harness having a release buckle 9 or buckles connecting the two lap straps centrally of the child's trunk. The first pair of straps are entrained over the top of the backrest and the attachment plates thereon are coupled to the beam in the manner described hereinafter. In addition to the security afforded by the anchorage points provided by the beam, further anchorage points may be provided at floor level, the lap straps of the harness being connected to such further anchorage points.

It will also be understood that the beam 14 may be used as an attachment point for a child's seating unit or for a headrest to be supported at or above the top of the vehicle seat backrest.

The beam 14 is formed with a hole 16 adjacent each end thereof and is mounted at each end thereof by means of a two-part mounting assembly comprising a bracket 18 to be secured either to side panelling of the vehicle or to the parcel shelf where provided, and a box-like casing 20, the base of which is formed with an aperture 22 through which an end portion of the beam 14 can be inserted so that the respective hole 16 lies within the confines of the casing 20. For reasons mentioned hereafter, the aperture 22 is dimensioned so that there is a clearance, typically 1/16 inch, around the beam 14. The bracket 18 comprises a generally rectangular attachment plate 24 bordered around part of its perimeter by three flanges 26, 28 and 30 which are arranged in generally U-shaped configuration with the flange 28 constituting the base of the U.

The attachment plate 24 is formed with one or more holes 32 (two are illustrated) for reception of screw-threaded fasteners which serve to secure the bracket 18 either to the vehicle side panelling (for example, with the fasteners engaging in tapped holes provided in metal pads inserted into the cavity between the internal and external cladding of the vehicle at the appropriate location) or to a further bracket 34 which may be fixed to the vehicle parcel shelf by further fasteners passing through holes 36. The attachment plates 24 may be of greater length than illustrated and may be adapted to form an anchorage for safety belt straps to be used by adults. If desired, the plates 24 may support an inertia reel of the safety belt.

The flanges 26, 28 and 30 and the casing 20 are so dimensioned that the flanges 26, 28 and 30 may be received snugly within the casing 20 with the side wall 38 of the casing 20 closing the mouth of the U defined by the flanges. A detent is provided to retain the casing in a position in which the flanges are received within its confines and in the illustrated embodiment, the detent comprises a stud 40 mounted on a leaf spring 42 on the inside face of the flange 28, the stud 40 being urged so as to project through a hole in the flange 28 for engagement in a hole 44 provided in the side wall 46 of the casing. The casing 20 may be separated from the bracket 18 simply by depressing the exposed portion of the stud 40 until it disengages from the hole 44.

To assemble the beam 14 to the brackets 18, the casings 20 are each positioned on respective end portions of the beam a sufficient distance from the end of the beam to allow the ends of the beam to be introduced between the flanges 26, 30. The casing 20 are then slid towards the respective ends of the beam so that the flanges 26, 28 and 30 are enclosed within the casing and the detent is operative to retain the casing on the bracket 18. In this way, the beam is held securely by each mounting assembly because the side wall 38 completes the peripheral opening between flanges 26, 30. To prevent rotation of the beam within the mounting assemblies and also to provide lateral restraint for the sides of the vehicle, especially when the latter is of the estate-type, a peg 48 is secured to the flange 28 of each bracket 18 for reception in a respective hole 16 in the beam 14.

In practice, before assembling the beam thereto, the brackets 18 are first secured within the vehicle, immediately behind the rear seat(s) of a four seater vehicle and adjacent the top of the rear seat(s), either to the side panelling at opposite sides of the vehicle or to the parcel shelf, in such a way that the open mouths of the U's defined by the flanges 26, 28 and 30 are presented rearwardly. Also, in practice, a beam of standard length will be supplied to be cut to size according to the internal width of the vehicle at the position the beam is to be fitted. For this reason, the beam may be supplied with a hole 16 at only one end thereof, the hole 16 at the opposite end being formed after the beam has been cut to size. The position of the second hole 16 may be ascertained by attaching a self-adhesive pad to the respective end of the beam in the region where the second hole is to be formed. The beam is then assembled to the brackets 18 as aforesaid, but without attaching the casings 20 to the brackets, so that the peg 48 at the non-apertured end of the beam produces an imprint on the pad. A hole may then be drilled in the beam at the position marked by the imprint.

It will be noted that when the beam is assembled to the brackets 18 and the casings 20 are engaged with the brackets, the clearance between the beam and the apertures 22 permits a certain degree of tilting of the beam relative to the brackets when the latter are not fixed within the vehicle. Thus, when the brackets 18 are fixed in position, the beam need not be exactly perpendicular to the attachment plate 24. This allows assembly of the beam to the brackets in cases where the surfaces of the vehicle side panelling, to which the brackets are secured, are inclined in a vertical direction and/or horizontally with respect to the fore-and-aft axis of the vehicle.

To prevent rattle of the beam within the casings 20, each end portion of the beam may be surrounded by a resilient ring 50 which is arranged to contact the internal surfaces of the flanges 26, 28 and 30 and the wall 38 of the casing 20. It will be noted that forward movement of the beam is prevented by engagement with the flanges 28 of the brackets 18 thereby providing considerable strength against collision impact and preventing collapse of the backrest of a vehicle seat in a rearward direction, particularly in vehicles of the estate type. Also, the casings 20 when interfitted with the flanges 26, 28, and 30 serve to restrain movement of the beam in the rearward direction. Further, because of the interengagement between the pegs 48 and the holes 16 in the tube, the beam and mounting assembly affords considerable strength widthwise of the vehicle to restrain the sides of the vehicle against collapse or bursting as may occur in a collision.

The beam 14 may be readily dismounted without the aid of any tools simply by depressing the detent studs 40, separating the casings 20 from the brackets 18 and then withdrawing the beam from between the flanges 26, 30 through the open mouth of the U defined by the flanges 26, 28 and 30.

It will be understood that the beam 14 need not be of round section but may be of polygonal e.g. square, configuration with the aperture 22 modified accordingly.

FIG. 2 illustrates one form of fastening device 52 for use in securing the ends of the straps of a child's safety harness to the beam 14. As shown, the device comprises a metal strip bent to form a generally circular portion 54 which embraces the beam and a pair of end portions 56 and 58 having aligned apertures receiving a bolt 60 which serves to pivotally connect an attachment plate 62 to the end portions 56, 58 the plate 62 being formed with a transverse slot 64 for reception of a hook 65 secured to the end of the harness strap. The bolt 60 co-operates with a nut 66 so that, when turned in the appropriate sense, it serves to draw the end portions 56 and 58 together to tighten the circular portion 54 onto the beam. By turning the bolt 60 in the opposite sense the clamping force can be released to allow the device to be positioned along the beam according to requirements. It will be understood that at least two such devices 52 will be provided at spaced positions along the length of the beam. Thus, as shown in FIG. 1 two such devices 52 are provided to provide anchorages for the shoulder straps of the child's safety harness. It will be understood that a further pair of devices 52 could be provided for use with a further safety harness or other passenger restraint.

In a modification, the plate 62 and the hook construction 65 may be omitted and the end portions 56 and 58 may have aligned slots therein for direct reception of the strap.

As described above, the beam 14 is cut to size according to the internal dimensions of a given vehicle. In a more sophisticated arrangement, the beam may be longitudinally adjustable; for example the beam may comprise two (or possible more) telescopically-interconnected sections so that the beam may be adjusted by sliding the sections relative to one another to obtain the required beam length, means then being provided to fasten the beam sections in a selected position of adjustment.

What I claim is:

1. An assembly for providing anchorage points within a motor vehicle for attachment of a passenger restraint, said assembly comprising an elongate beam, and a mounting structure at each end of the beam for supporting the beam adjacent the top of the backrest of at least one seat within the vehicle, each mounting structure comprising a first part which is adapted to be secured to a fixed part of the vehicle and which has a flange extending generally in the outline of a U that partially surrounds the end of the beam, leaving the beam free to be removed and reinserted through the open side of the U, and a second part which encircles the beam, is movable axially of the beam, and telescopes with said flange, whereby movement of the second part axially into telescoping relation with said flange locks the beam in place by preventing movement of the beam out of the open side of the U.

2. An assembly as claimed in claim 1 in which the beam and the first part of each mounting structure have a socket and spigot connection wherein the spigot extends generally in the direction of the legs of the U and holds the beam axially captive with respect to said first part.

3. An assembly as claimed in claim 1 in which the first and second parts of each mounting structure are releasably connected by detent means comprising an aperture in one of said parts and a member carried by the other part which is springloaded into engagement with said aperture.

4. An assembly as claimed in claim 1 in which the first part of each mounting structure has holes for reception of screw-threaded fasteners, the axes of the holes extending parallel to the beam in its assembled position.

5. An assembly as claimed in claim 1 in which each mounting structure includes a third part which has an L-shaped cross section and is adapted to be secured to the first part and has holes for reception of screw-threaded fasteners, the axes of the holes extending transversely to the beam in its assembled position.

6. An assembly as claimed in claim 1 in which the second part of each mounting structure encircles the beam with clearance.

7. An assembly as claimed in claim 1 including fastening elements adapted to be connected to the beam, for securing the ends of the straps of a harness.

8. An assembly as claimed in claim 7 in which the fastening elements are slidable lengthwise of the beam and include means for clamping each element in position on the beam.

9. An assembly as claimed in claim 1 in which the beam is circular in cross section.

* * * * *